Oct. 26, 1954   H. H. HAMILTON ET AL   2,692,697
OUTLET BOX AND MEANS FOR MOUNTING SAME
Filed Jan. 20, 1951   2 Sheets-Sheet 1
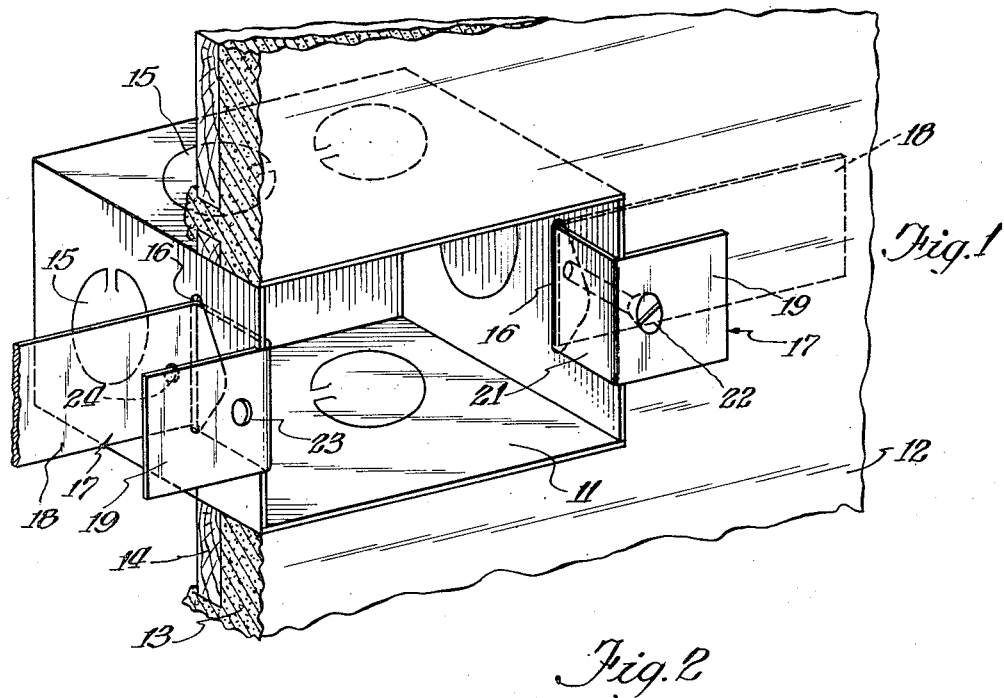
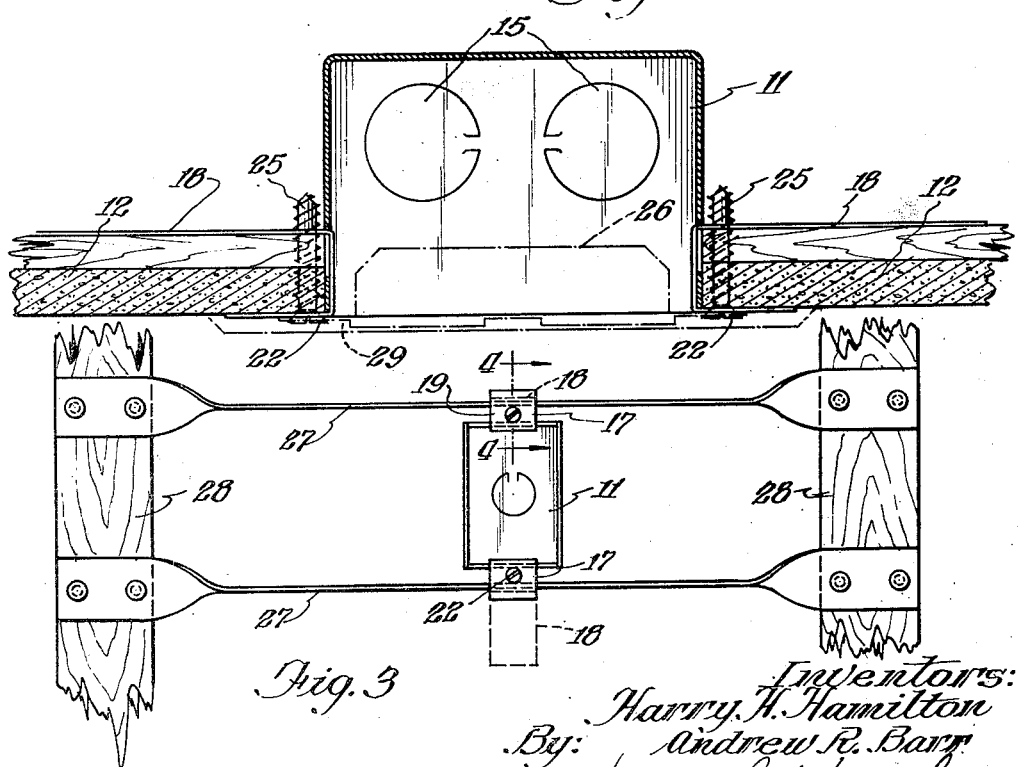

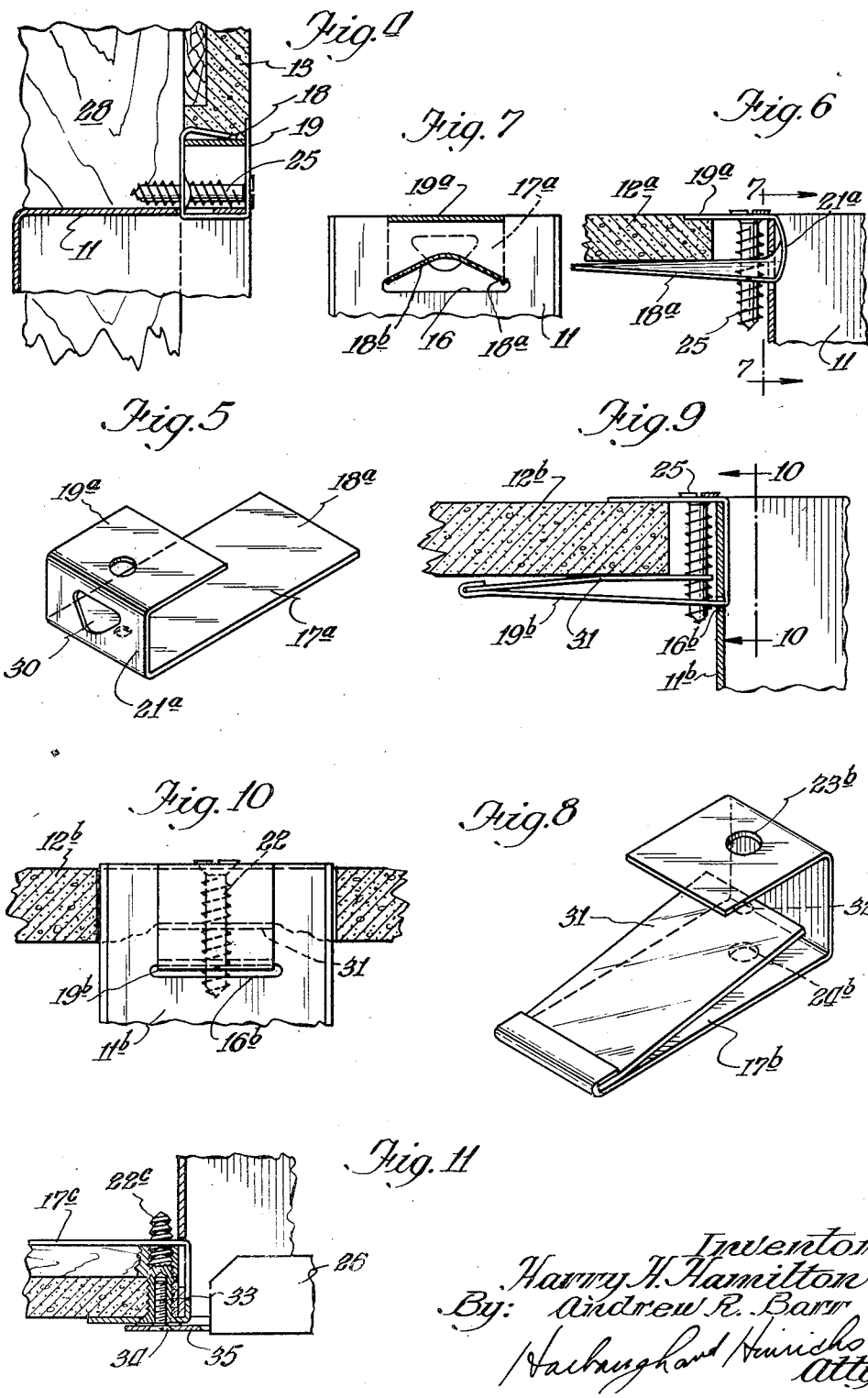

Patented Oct. 26, 1954

2,692,697

UNITED STATES PATENT OFFICE 2,692,697

OUTLET BOX AND MEANS FOR MOUNTING SAME

Harry H. Hamilton, Franklin Park, and Andrew R. Barr, Chicago, Ill.

Application January 20, 1951, Serial No. 207,029

4 Claims. (Cl. 220—3.6)

This invention relates generally to electrical outlet or junction boxes and more particularly to an improved box and mounting means.

In wiring buildings the conventional practice is to enclose all circuits which pass through the walls of the building in conduit or armored cable. At the points in the circuit where switches, convenience outlets or lighting fixtures are to be connected the conduit or armored cable is led into metal boxes mounted within a wall or ceiling. The boxes are grounded to the cable armor or the conduit with the result that all portions of the circuit are surrounded by grounded metal.

The usual practice when wiring a new structure is to mount the outlet boxes in the walls or ceilings and then to run the conduit and wire or cable to the boxes. The boxes are usually mounted prior to lathing and plastering the walls. When conduit is used the conductors may be pulled through the conduit at any time after it is installed regardless of whether the plaster or lath has been applied. However, in the case of armored cable it is usually preferred to run all of the cable before the lathing is done. In either event the convenience receptacles or switches are usually not installed until the covering of the walls is completed.

In old buildings which are to be rewired, the walls are usually plastered or otherwise covered before the boxes are installed, and the preferred procedure is to run cable first, connect it into the boxes and then mount the boxes in the existing walls.

Various arrangements have been provided for supporting outlet boxes, most of which have been directed to mounting boxes in partly finished walls prior to plastering. Solutions also have been proposed to the problem of mounting boxes in finished walls, but no satisfactory universal box mounting has been devised heretofore which was readily adaptable for the installation of boxes in both finished and unfinished walls.

The conventional universal mounting arrangement is to provide L-shaped brackets on either side of the box which can be adjusted to be located at various distances from the front of the box for unfinished walls. These brackets are provided with holes through which nails or screws are driven to mount the box. The adjustability of the brackets makes it possible with unfinished walls to locate the box with respect to the wall surface either in the plaster or on the lathing against outward pulls and at such a depth that its front is flush with the finish coat of plaster. This support against outward pulls cannot be established behind the plaster in installations on finished walls. Such arrangements are far from satisfactory, however, since it is usually preferable to mount the boxes before the lathing is completed and since it is difficult to secure nails or screws to metal lath, and impossible to drive them into finished plaster walls without cracking the plaster around the box receiving opening.

One important object of this invention is to provide a universal box mounting arrangement which may be used regardless of whether the box is to be mounted in a finished or unfinished wall or ceiling, and regardless of the thickness of plaster on a finished wall.

Another object is to provide an arrangement especially suited for mounting boxes in finished walls in that the mounting is such that the front of the box is always flush with the face of the wall regardless of the thickness of plaster, wall board or other covering material.

Another object is to provide a mounting arrangement wherein the opening made through the plaster can be the same size as the box or almost as large as the cover plate without impairing the solidity of the support.

A further object is to provide a mounting which strengthens the wall rather than weakens it, most conventional mountings actually weakening the wall in which they are installed.

A further object is to provide a simplified mounting arrangement which may be readily fabricated, having a minimum of parts and which may be simply and easily installed without special tools or skill being required.

A further object is to provide an arrangement whereby the outlet box may be mounted in any desired position in wall or ceiling without the necessity of its being disposed at a particular location with respect to a stud or beam.

Other objects and advantages of the outlet box and mounting means of this invention will present themselves to those familiar with the art on reading the following specification in conjunction with the drawings and the appended claims.

In the drawings:

Fig. 1 is a perspective view showing a preferred embodiment of the outlet box and mounting means of this invention mounted in a latch and plaster wall;

Fig. 2 is a top view of the box;

Fig. 3 is an elevation showing the manner in which the box is mounted on bars between studs or beams prior to application of the wall covering;

Fig. 4 is a section taken on line 4—4 of Fig. 3 showing in addition the lathing and plaster;

Fig. 5 is a perspective view of a modified form of the mounting clip;

Fig. 6 is a section showing the modified form of the clip attached to a box;

Fig. 7 is a section taken on line 7—7 of Fig. 6;

Fig. 8 is a perspective view of another modification of the clip;

Fig. 9 is a view similar to Fig. 6 of the modification of Fig. 8;

Fig. 10 is a section taken on line 10—10 of Fig. 9, and

Fig. 11 is a section, similar to Fig. 2, of a modified embodiment.

A fundamental concept of this invention is to provide an outlet box having a slot in each end wall spaced to the rear of the open front a distance approximately equal to the thickness of the wall. A light sheet metal clip, having the general form of a letter J or U is provided for each of the slots. The box is mounted in existing walls by cutting an opening in the wall and slipping the one leg of each clip through the slot to engage the rear surface of the wall. The other leg of each clip extends around the front of the box parallel to the rear leg and engages the front surface of the wall. To secure the clips to the wall, a screw is provided for each clip which pulls the two legs together when tightened. When the box is to be mounted in an unfinished wall the same arrangement is provided except that the clips are clamped bent around spaced cross bars or straps which are nailed to the studding or beams prior to application of the lathing and plaster or other wall covering.

A preferred embodiment of the outlet box 11 is shown in Figs. 1 and 2 as installed in a plaster wall 12. This installation is typical of those where the outlet box 11 is mounted in the wall after the wall has been completed. The wall 12 has been illustrated in the drawing as formed of plaster 13 and laths 14, but it might be plaster board, plaster on wire lath or any other conventional construction.

The box 11 is a simple rectangular box formed of sheet metal. It is to be understood, however, that almost any outlet box may be mounted in the same manner. The box 11 is provided with a plurality of conventional knock-out plugs 15 which are removed to permit the conduit or cable to be connected to the box. The front of the box 11 is open and triangular slots 16 are provided on opposite ends of the box, spaced rearwardly from the open front a distance substantially equal to the thickness of the wall 12. It is preferred that the rear edges of the slots 16 be spaced inwardly a distance equivalent to the thickness of the thickest wall with which it is anticipated that the box will be used.

A mounting clip 17 is provided for each of the slots 16. The clips 17 are U-shaped, having two parallel legs 18 and 19. These clips are preferably formed of light sheet metal so that they may be readily bent. The interconnecting portion 21 of each clip has substantially the same length as the distance from the front of the box 11 to the rear of the slots 16 so that the clips 17 may be readily slipped through the slots 16 as illustrated with the longer rear legs behind the wall 12 and the shorter front legs 19 in front of the wall. The ends of the two legs 18 and 19 are drawn together so as to grip the wall 12 tightly after the clip has been slipped into place, even if the wall is considerably thinner than the length of interconnecting portion 21.

Each of the legs 8 and 9 is provided with a hole for a clamping screw 22. The hole 23 in the front of the clip is somewhat larger than the hole 24 in the rear leg so that the self-tapping screw 22 which serves to draw the two legs together threadably engages the rear leg 18 but has sufficient clearance in the hole 23 to provide clearance for the threads 25 on the screw 22. Thus when the screw 22 is tightened the rear leg 18 is pulled toward the front leg 23 to clamp the clip 17 to the wall 12.

The installation of the outlet box 11 in the wall 12 is very simple. The first step is to cut an opening in the wall, preferably slightly larger than the outlet box 11. The box is then slipped from the front of the wall into the position shown in Fig. 1 until the open front of the box 11 is flush with the surface of the plaster 13. The two clips 17 are then slipped into the slots 16 and pushed outwardly until the interconnecting portions 21 lie against the sides of the box 11. The screws 22 are then driven into the holes 23 and 24 to clamp the brackets 17 tightly against the wall 12. Drawing up tightly distorts the legs 18 and 19 towards each other around the portion of the box disposed between them and thus they become an assembled portion of the box permitting removal of the screws temporarily for mounting outlet receptacles or the like.

If a receptacle such as that shown in broken lines in Fig. 2, indicated at 26, is to be installed in the box 11, the screws 22 may be used to hold the receptacle 26 in place. Thus the need for ears on the box and conventional screws for this purpose is eliminated. This is also true in the case of switches or other elements which are normally supported in this manner. Considerable time may elapse between the installation of the box and the mounting of the receptacle 26 therein, for the clips 17 will hold the box securely in place regardless of whether or not the screws 22 have been installed. Following the installation of the switch or receptacle 26 a conventional cover plate 29 is installed to completely enclose the box 11, the opening in the wall 12 and the front legs 19 of the clips 17.

Another procedure which may be followed is to mount the box completely without the receptacle 26 and remove the screws prior to installation of the receptacle. This arrangement is quite satisfactory since the burrs from self-tapping screws on the rear legs 17 serve to hold the legs securely in place when the screws 22 are removed. The effect of the burrs, however, is not such as to prevent ready removal of the clips in the event it is desired to relocate the box 11 at a later date, for all that need be done is wedge the tip of a screw driver between the interconnecting portion 21 of the clip 17 and the side of the box to pry the clip loose so that it may be withdrawn from the box. When the clips have been removed it is a simple matter to slip the box out of the wall 12.

A preferred arrangement for mounting the outlet box in a wall prior to plastering is shown in Fig. 2. To accomplish this a pair of straps or bars 27 is nailed to two adjacent studs or beams 28. The outlet box 11 is then supported between the straps which have their central portions twisted at right angles so as to lie parallel to the sides of the box, and the clamps 17 are inserted in the slots 16 in the same manner as when the box is to be mounted in the wall. The screws 25 are then inserted and tightened to clamp the two legs to the straps 27, and the ends of the rear legs 18 are bent forwardly around the edges of the straps 27 to provide a firm support as shown in Fig. 4. The wall is then lathed and plastered in the conventional manner, the front face of the plaster 13 being made level with the front of the outlet box 11. Bending the ends of the rear legs 18 around the bars causes the clips 17 to be held in place after plastering so that they cannot be withdrawn unless the plaster 13 is first chipped away. Thus boxes installed in this manner are permanently mounted. A further advantage of this arrangement is the fact that the box 11 may be located at any desired position between the beams or studs 28. Moreover the box location may be shifted at any time prior to plastering. This feature is desirable inasmuch as it simplifies the running of conduit or cable to the box.

A modified form of the clip 17a is shown in Figs. 5-7 of the drawing. The clip 17a is substantially like the preferred embodiment except that a punched out triangular opening 30 is provided in the interconnecting portion 21a. The opening 30 serves to predetermine the location and degree of distortion to the rear leg 18a to fold or bend longitudinally to the form shown in broken lines 18b of Fig. 7 and be drawn tightly against the wall 12a. In this case the wall is a piece of plaster board which has considerably less thickness than the distance between the legs of the clip 17a. More particularly, when the box is installed and the screws 25 are tightened, the clip 17a assumes the shape shown in Figs. 6 and 7, the rear leg 18a bending to have a concave shape and the interconnecting portion 21a bowing inwardly to shorten the effective width of the clip to the degree necessary to establish a clamping relationship. The slot 16 in the side of the outlet box 11 is triangular in shape in order to permit the middle portion of the leg 18a to assume a concave shape as shown. This type of clip has been found to be particularly useful where the walls in which the box is to be mounted are substantially thinner than the distance between the front of the box and the bottom of the slots 16. Except for the features noted the use of this clip is substantially the same as those of the preferred embodiment, and it may be used for thick plastered walls as well as with the bars 27 for unfinished walls.

Another modification of the clip 17b is shown in Figs. 8-10 of the drawing. This clip is similar to the preferred embodiment, but it has an additional element in the form of a leaf spring 31 which is attached to the end of the rear leg 19b. This spring 31 not only serves to hold the clip against the wall 12b but also serves as a high pressure clamping element when the screws 22 are tightened after the clips 17b have been inserted. The resilience of elements 31 holds them tightly against the wall 12b on insertion in the box 11b. When the screws 25 are driven the threads 25 engage the edges of the holes 32 in the free ends of the elements 31. The holes 23b and 24b in the legs of the clip are larger than the maximum diameter on the threads 25 so that only the holes 32 are engaged by the threads. Thus, when the screws 25 are tightened, the elements 31 are pulled outwardly to exert a relatively high clamping pressure on the wall 12b. The outlet box 11b of this embodiment differs slightly from the preferred form in that the slots 16b preferably have parallel sides instead of being triangular as in the preferred embodiment.

The modification shown in Fig. 11 is substantially the same as the preferred embodiment except that the clips 17c have slightly larger holes 23c and 24c to accommodate larger screws 22c having threaded axial bores 33. The purpose of the threaded bores 33 is to receive smaller screws 34 which support the lugs or ears 35 on a receptacle or other circuit element 26 in order to mount the receptacle in the box 11. With this arrangement it is possible to mount the box completely, drawing the legs of the clip together with the screws 22c, and later to mount the receptacle 26 without removing the screws 22c.

From the foregoing it will be apparent that a superior outlet box and means for mounting have been provided, the box being adapted to be installed in both finished and unfinished walls, quickly and easily without the need for special skills or tools. A further advantage of the mounting of the invention is that the boxes are more firmly supported than conventional boxes, particularly against being pulled out of the wall as may occur when lamp cords are jerked from convenience outlets. The novel arrangement of the two clip legs also serves to strengthen the walls by clamping the edges of the opening together. This is particularly advantageous in the case of plasterboard, the edges of which normally tend to separate.

Various changes and modifications in addition to those set forth herein may be made without departing from the spirit of this invention, the scope of which is commensurate with the following claims.

What is claimed is:

1. In combination an outlet box having an open front and a pair of slots in opposite walls spaced from the open front, a U-shaped clip received in each of said slots with the legs of the clip extending outwardly from the wall of the box with one of the legs through one of the slots, the front leg of each clip being in substantially the same plane as the open front of said box and the other being spaced rearwardly therefrom, and a clamping screw for each of said clips extending through an enlarged hole in the front leg of the clip and threadably received in a hole in the rear leg of the clip so that said legs are displaced towards each other when the screw is tightened to secure the box in a wall, said screw being disposed in close proximity to the wall of the box, said slots in the walls of said box being triangular in shape with their apexes extending toward the front leg to cause the middle portions of the rear legs to be bent forwardly and the portions of the clips interconnecting the front and rear portions having openings therein to assume a concave shape when the screws are tightened.

2. In combination an outlet box having an open front and a pair of slots in opposite walls spaced from the open front, U-shaped clips received in each of said slots with the legs of the clips extending outwardly from the sides of the box, one leg of each clip being in substantially the same plane as the open front of said box, and means for clamping each of said clips so that said legs may be drawn towards each other when the means is tightened to support the box in a wall including a screw disposed in close proximity to the wall of the box, the slots in the walls of the box being triangular in shape with their apexes extending toward the front leg to permit the middle portions of the rear legs to be bent forwardly and the portions of the clips interconnecting the front and rear portions having openings therein permitting the rear legs to assume a concave shape when the means are tightened.

3. An outlet box having an open front and a slot in a wall spaced from the open front, a U-shaped clip received in said slot, the base of said clip being received against the inner face of the wall and the legs of the clip extending outwardly from the wall of the box, the front leg of the clip being in substantially the same plane as the open front of said box and the rear leg being spaced rearwardly therefrom and extending through a slot, said rear leg being substantially longer than said front leg and a screw for said clip extending through an enlarged hole in the front leg and threadably received in a hole in the rear leg so that said legs are drawn together when the screw is tightened to secure the box in a wall, said screw being disposed in close proximity to said wall, the slot in the wall of the box being triangular in shape with its apex extending toward the front leg to permit the middle portion of the rear leg to be bent forwardly and the portion of the clip interconnecting the front and rear portions having an opening therein permitting the rear leg to assume a concave shape when the screws are tightened.

4. An outlet box having an open front and a slot in a sidewall spaced from the open front, a U-shaped clip received in said slot with the legs of the clip extending outwardly from the wall of the box, the front leg of the clip being in substantially the same plane as the open front of said box and being substantially shorter than the rear leg, and means for clamping said clip to clamp said legs together including an element interconnecting the legs in close proximity to the side wall, the slot in the wall of the box being triangular in shape with its apex extending toward the front leg to permit the middle portion of the rear leg to be bent forwardly and the portion of the clip interconnecting the front and rear portions having an opening therein permitting the rear leg to assume a concave shape when the screw is tightened.

References Cited in the file of this patent

UNITED STATES PATENTS

| Number | Name | Date |
| --- | --- | --- |
| 1,791,748 | Bernet | Feb. 10, 1931 |
| 1,963,951 | Bowers | June 26, 1934 |
| 2,039,550 | Norton | May 5, 1936 |
| 2,334,799 | Thompson | Nov. 23, 1943 |